US011527152B2

(12) United States Patent
Kane et al.

(10) Patent No.: US 11,527,152 B2
(45) Date of Patent: Dec. 13, 2022

(54) PREEMPTIVE TRAFFIC ROUTING BASED ON PARSING OF EMERGENCY DISPATCHES

(71) Applicant: INTERNATIONAL BUSINESS MACHINES CORPORATION, Armonk, NY (US)

(72) Inventors: Michael Kane, Poughkeepsie, NY (US); Colin Edward Masterson, Rochester, MN (US); Suraush Khambati, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 16/794,325

(22) Filed: Feb. 19, 2020

(65) Prior Publication Data

US 2021/0256841 A1    Aug. 19, 2021

(51) Int. Cl.
| | | |
|---|---|---|
| *G08G 1/01* | (2006.01) | |
| *G08G 1/00* | (2006.01) | |
| *G01C 21/36* | (2006.01) | |
| *G10L 15/22* | (2006.01) | |
| *G10L 15/18* | (2013.01) | |

(52) U.S. Cl.
CPC ....... *G08G 1/0141* (2013.01); *G01C 21/3691* (2013.01); *G08G 1/0129* (2013.01); *G08G 1/0133* (2013.01); *G08G 1/202* (2013.01); *G10L 15/1822* (2013.01); *G10L 15/22* (2013.01)

(58) Field of Classification Search
CPC .. G08G 1/0141; G08G 1/0129; G08G 1/0133; G08G 1/202; G01C 21/3691; G10L 15/1822; G10L 15/22
See application file for complete search history.

(56) References Cited

U.S. PATENT DOCUMENTS

| | | |
|---|---|---|
| 5,504,482 A | 4/1996 | Schreder |
| 6,700,504 B1 | 3/2004 | Aslandogan et al. |
| 7,174,153 B2 | 2/2007 | Ehlers |
| 7,881,945 B2 | 2/2011 | Schmitt et al. |
| 8,350,721 B2 | 1/2013 | Carr |
| 9,691,278 B2 | 6/2017 | Poornachandran et al. |

(Continued)

FOREIGN PATENT DOCUMENTS

WO    2010111442 A1    9/2010

OTHER PUBLICATIONS

Mell, Peter et al. "The NIST Definition of Cloud Computing—Recommendations of the National Institute of Standards and Technology" U.S. Department of Commerce; Special Publication 800-145; 7 pgs.

(Continued)

*Primary Examiner* — Mathew Franklin Gordon
(74) *Attorney, Agent, or Firm* — Cantor Colburn LLP; Tihon Poltavets

(57) ABSTRACT

Embodiments of the invention include preemptive traffic routing based on parsing of emergency dispatches. Aspects of the invention obtaining an emergency dispatch transmission and parsing the emergency dispatch transmission to obtain a location and a type of an emergency event. Aspects also include determining, based at least in part on the location and the type of the emergency event, an expected impact on traffic in an area including the location. Aspects further include transmitting the expected impact on traffic in the area to a vehicle navigation application.

20 Claims, 6 Drawing Sheets

(56) References Cited

U.S. PATENT DOCUMENTS

| | | |
|---|---|---|
| 9,905,129 B2 | 2/2018 | Colella et al. |
| 9,958,272 B2 | 5/2018 | Morris, IV et al. |
| 10,049,570 B2 | 8/2018 | Foreman et al. |
| 10,147,318 B2 | 12/2018 | Gebers |
| 2003/0141990 A1 | 7/2003 | Coon |
| 2010/0158202 A1 | 6/2010 | Johnson et al. |
| 2011/0018736 A1 | 1/2011 | Carr |
| 2017/0352268 A1 | 12/2017 | Colella et al. |
| 2018/0268690 A1 | 9/2018 | Gebers |
| 2018/0309592 A1 | 10/2018 | Stolfus |
| 2019/0215675 A1 | 7/2019 | Lesage et al. |

OTHER PUBLICATIONS

Sullivan, Andrew "Optimizing EMS Through Intelligent Transportation System (ITS) Technologies", National Center for Transportation Systems Productivity and Management (NCTSPM); retrieved at: https://rosap.ntl.bts.gov/view/dot/36986/dot_36986_DS1.pdf?; Dec. 16; 62 pgs.

PREEMPTIVE TRAFFIC ROUTING BASED ON PARSING OF EMERGENCY DISPATCHES

BACKGROUND

The present invention generally relates to vehicle routing, and more specifically, to preemptive traffic routing based on parsing of emergency dispatches.

When an accident occurs, the vehicular traffic starts backing up. In addition, after the emergency responders arrive at the scene of the accident, it further clogs the flow of vehicles, exacerbating the situation of traffic. GPS-based traffic routing systems react to backups after they occur based on vehicle monitoring and clustering and route vehicles around the area of an accident. One drawback of such vehicle routing systems is that these systems do not begin rerouting vehicles around an accident scene until after traffic starts backing up.

SUMMARY

Embodiments of the present invention are directed to preemptive traffic routing based on parsing of emergency dispatches. A non-limiting example computer-implemented method includes obtaining an emergency dispatch transmission and parsing the emergency dispatch transmission to obtain a location and a type of an emergency event. The method also includes determining, based at least in part on the location and the type of the emergency event, an expected impact on traffic in an area including the location. The method further includes transmitting the expected impact on traffic in the area to a vehicle navigation application.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention provide methods, systems, and computer program products for preemptive traffic routing based on parsing of emergency dispatches. In accordance with one or more embodiments of the present invention, information regarding emergency events is obtained from dispatch information provided to emergency responders. The information regarding emergency events is then analyzed and used to update vehicle routing/navigational databases and in some cases to update the routes of autonomous vehicles. As a result, vehicles can be rerouted at the time that the police, fire or ambulance dispatchers learn about the accident. By preemptively rerouting vehicular traffic before traffic starts building at the site of an accident, the severity of traffic build-up can be reduced, the scene of the accident is made safer by reducing vehicular traffic and access to the accident for emergency responders is improved.

Figure 1:
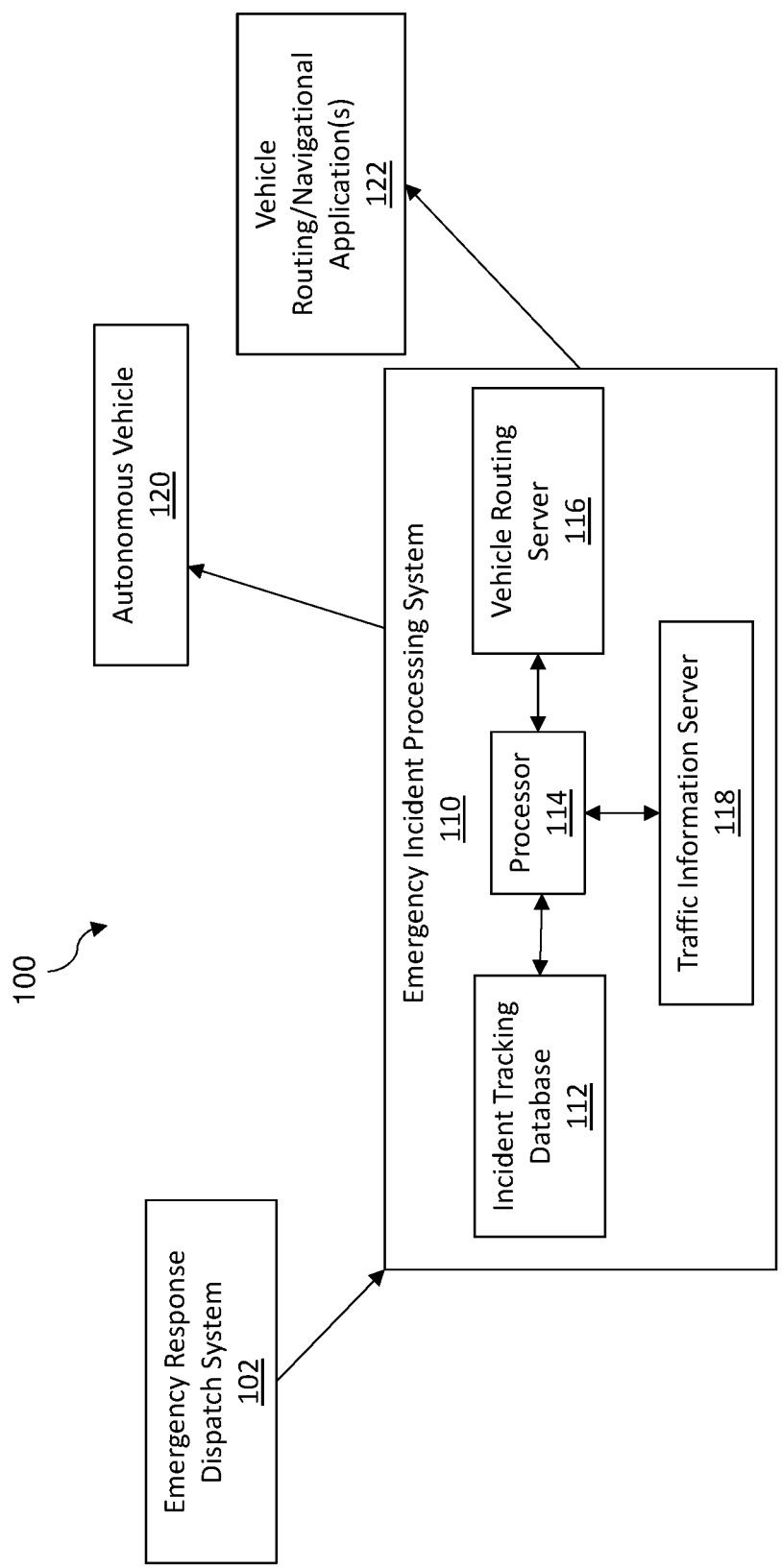
FIG. 1 depicts a block diagram of a system for preemptive traffic routing based on parsing of emergency dispatches according to one or more embodiments of the present invention.

Turning now to FIG. 1, a block diagram of a system 100 for preemptive traffic routing based on parsing of emergency dispatches according to one or more embodiments of the present invention is shown. As illustrated the system 100 includes an emergency response dispatch system 102. In one embodiment, the emergency response dispatch system 102 is configured to receive emergency signals and to dispatch emergency responders. The emergency signals can be received via electronic alarms, 911 calls, or the like. In one embodiment, the emergency response dispatch system 102 is configured to dispatch emergency responders via radio-frequency (RF) communication.

The system 100 also includes an emergency incident processing system 110 that is configured to receive the dispatches provided to the emergency responders by an emergency response dispatch system 102. The emergency incident processing system 110 may be embodied in a processing system, such as the one shown in FIG. 6, or may be a node in a cloud computing system, such as node 10 in FIG. 4. The emergency incident processing system 110 includes a processor 114, an incident tracking database 112, a vehicle routing server 116, and a traffic information server 118. In exemplary embodiments, the emergency incident processing system 110 receives the dispatches provided to the emergency responders by the emergency response dispatch system 102 and utilizes the processor to analyze the dispatches. Depending on the format in which the dispatches are received, analyzing the dispatches can include converting an audio file into text. In addition, analyzing the dispatches includes extracting a location of an emergency event, a type of emergency event and other data regarding the emergency event from the dispatches.

In exemplary embodiments, once an emergency dispatch has been obtained and analyzed, the processor 114 creates an entry for the emergency event in the incident tracking database 112 and stored the information regarding the emergency event in the incident tracking database 112. In addition, the processor 114 obtains data from the traffic information server 118 and the vehicle routing server 116 that is used, along with the information regarding the emergency event, to determine an expected impact of the emergency event to traffic in the area of the emergency event. In exemplary embodiments, the data from the traffic information server 118 includes a normal traffic pattern for the area of the emergency event. In exemplary embodiments, the data from the vehicle routing server 116 includes information regarding the size and configuration of the roadways in the area of the emergency event. In exemplary embodiments, once all resources dispatched acknowledge that they are back in service the incident is cleared from the tracking database 112.

In one embodiment, once the expected impact of the emergency event to traffic in the area of the emergency event has been determined, the emergency incident processing system 110 is configured to provide incident data regarding the emergency event to one or more vehicle routing and/or navigational application(s) 122, which use the incident data to update the routing and navigational guidance provided to vehicles. In another embodiment, after the expected impact of the emergency event to traffic in the area of the emergency event has been determined, the emergency incident processing system 110 is configured to update a route of one or more autonomous vehicles 120 that are being controlled by the vehicle routing server 116.

In exemplary embodiments, the emergency incident processing system is configured to analyze dispatch communications and to determine: a nature of emergency event; a type and number of dispatched vehicles, a location of the emergency event, and a severity of emergency event.

Figure 2:
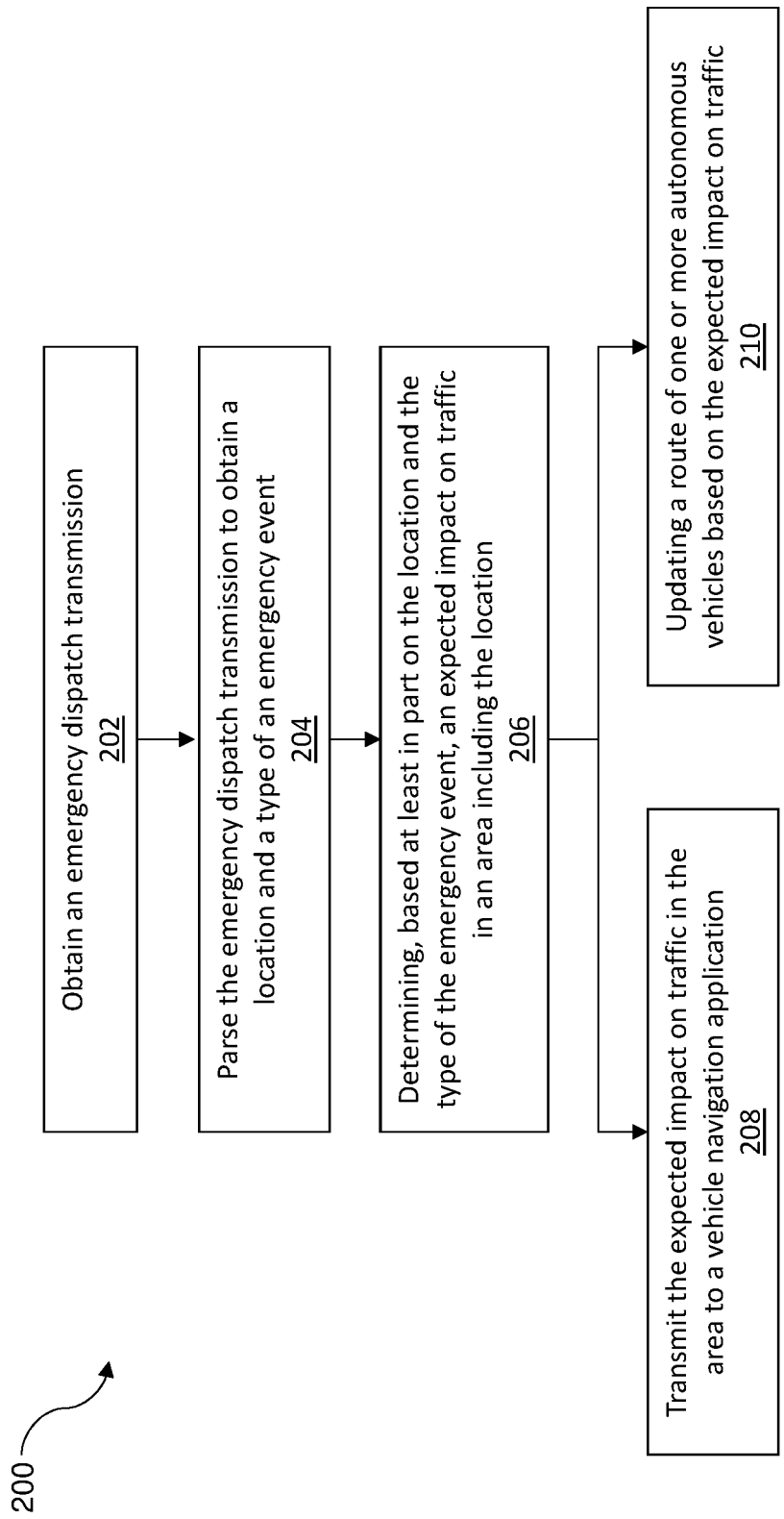
FIG. 2 depicts a flow diagram of a method for preemptive traffic routing based on parsing of emergency dispatches according to one or more embodiments of the present invention.

Turning now to FIG. 2, a flow diagram of a method 200 for preemptive traffic routing based on parsing of emergency dispatches is generally shown in accordance with one or more embodiments of the present invention. The method 200 shown in FIG. 2 may be executed by an operating system, such as OS 611 of FIG. 6, executing on a computer processor. The computer processor can be a standalone processor or a node in a cloud, such as a node 10 in FIG. 4.

As shown at block 202, the method 200 includes obtaining an emergency dispatch transmission. Next, as shown at block 204, the method 200 includes parsing the emergency dispatch transmission to obtain a location and a type of an emergency event. In exemplary embodiments, the emergency dispatch transmission is a radio frequency transmission and parsing the emergency dispatch transmission includes converting an audio signal of the emergency dispatch transmission to text. In one embodiment, parsing the emergency dispatch transmission also obtains a number and a type of emergency response vehicles dispatched to the emergency event.

Next, as shown at block 206, the method 200 includes determining, based at least in part on the location and the type of the emergency event, an expected impact on traffic in an area including the location. In exemplary embodiments, determining the expected impact on traffic in the area including the location includes obtaining traffic data corresponding to previous emergency events that had the number and the type of emergency response vehicles dispatched. In one embodiment, the expected impact on traffic in the area includes an indication of a number of lanes closed and an expected duration for that each of the lanes will be closed.

In one embodiment, after the expected impact on traffic in the area has been determined, the method 200 proceeds to block 208 and transmits the expected impact on traffic in the area to a vehicle navigation application. In another embodiment, after the expected impact on traffic in the area has been determined, the method 200 proceeds to block 210 and updates a route of one or more autonomous vehicles based on the expected impact on traffic.

In exemplary embodiments, the method also includes determining that the expected impact on traffic in the area has changed based at least in part on data received from one or more dispatched emergency vehicles and transmitting an updated expected impact on traffic in the area to the vehicle navigation application. For example, an operator of one of the emergency vehicles responds to the emergency dispatcher with an update on the emergency situation indicating that the accident has been cleared or that further resources are needed at the accident scene. In another example, a determination that the expected impact on traffic in the area has changed is based on a second emergency dispatch transmission regarding the emergency event. For example, an emergency dispatcher, dispatching additional resources to an accident scene or a dispatcher canceling or modifying a previous dispatch.

Figure 3:
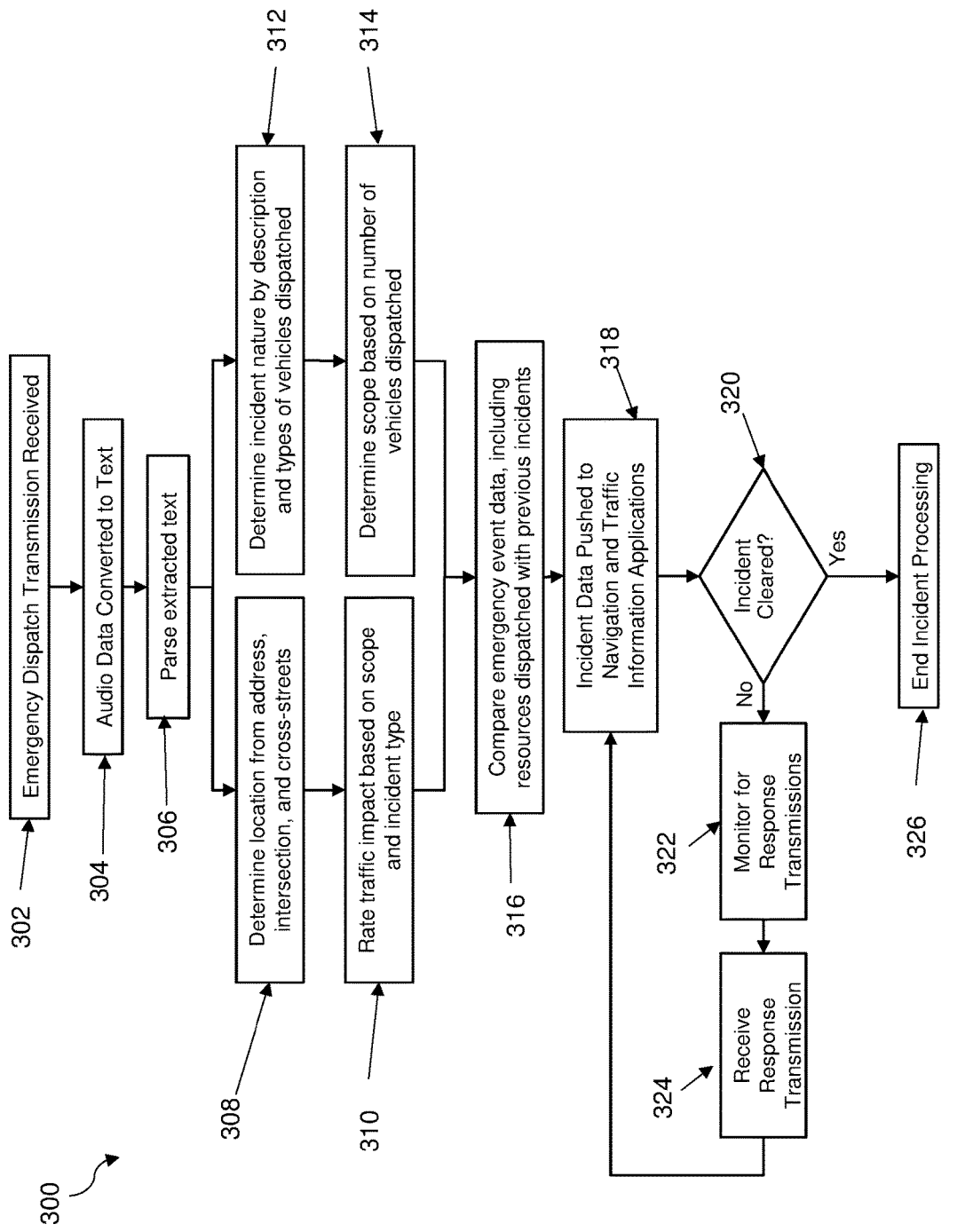
FIG. 3 depicts a flow diagram of a method for operating an emergency incident processing system according to one or more embodiments of the present invention.

Turning now to FIG. 3, a flow diagram of a method 300 for operating an emergency incident processing system is generally shown in accordance with one or more embodiments of the present invention. The method 300 shown in FIG. 3 may be executed by an operating system, such as OS 611 of FIG. 6, executing on a computer processor. The computer processor can be a standalone processor or a node in a cloud, such as a node 10 in FIG. 4.

As shown at block 302, the method 300 includes receiving an emergency dispatch transmission. Next, the method 300 includes converting the audio of the emergency dispatch transmission to text, as shown at block 304. Once the text has been extracted from the emergency dispatch transmission, the extracted text is parsed, as shown at block 306. The method 300 also includes determining a location of an emergency event that resulted in the emergency dispatch transmission based on address, intersection, and/or cross-streets identified in the emergency dispatch transmission, as shown at block 308. Next, as shown at block 310, the method 300 includes rating a traffic impact of the emergency event based on a scope and type of the emergency event.

As shown at block 312, the method 300 also includes determining a nature of the emergency event based on the text of the emergency dispatch transmission and based upon a type of vehicle that is being dispatched, e.g., a fire truck, ambulance, police, etc. Next, as shown at block 314, the method 300 includes determining a scope of the emergency event based on a number of vehicles dispatched. Once the scope, nature and location of the emergency event are determined, the method 300 proceeds to block 316 and compares the emergency event data, including resources dispatched, with previous incidents. Next, as shown at block 318, the method 300 includes pushing data regarding the emergency event to navigation and traffic information applications.

As shown at decision block 320, the method 300 also includes determining if the incident has been cleared. In exemplary embodiments, the determination that the incident has been cleared is based upon obtaining a responsive transmission from the dispatched vehicles to the dispatcher that indicate the incident has been cleared. If the determination is made that the incident has been cleared, the method 300 proceeds to block 326 and ends the incident processing. Otherwise, the method 300 proceeds to block 322 and monitors for responsive transmission from the dispatched vehicles to the dispatcher. Next, as shown at block 324, the method 300 includes receiving a responsive transmission from the dispatched vehicles to the dispatcher.

The flow diagrams of FIGS. 2 and 3 are not intended to indicate that the operations of methods 200, 300 are to be executed in any particular order, or that all of the operations of methods 200, 300 are to be included in every case. Additionally, methods 200, 300 can include any suitable number of additional operations.

In exemplary embodiments, preemptively routing traffic based on parsing of emergency dispatches provides several benefits in addition to preventing traffic from backing up in the area of the accident. By routing traffic away from the scene of an accident, the emergency responders at the accident scene are kept safer by the reduction in passing traffic. In addition, the preemptively routing system is effective in low-traffic areas where aggregating data from multiple vehicles or phones is difficult.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
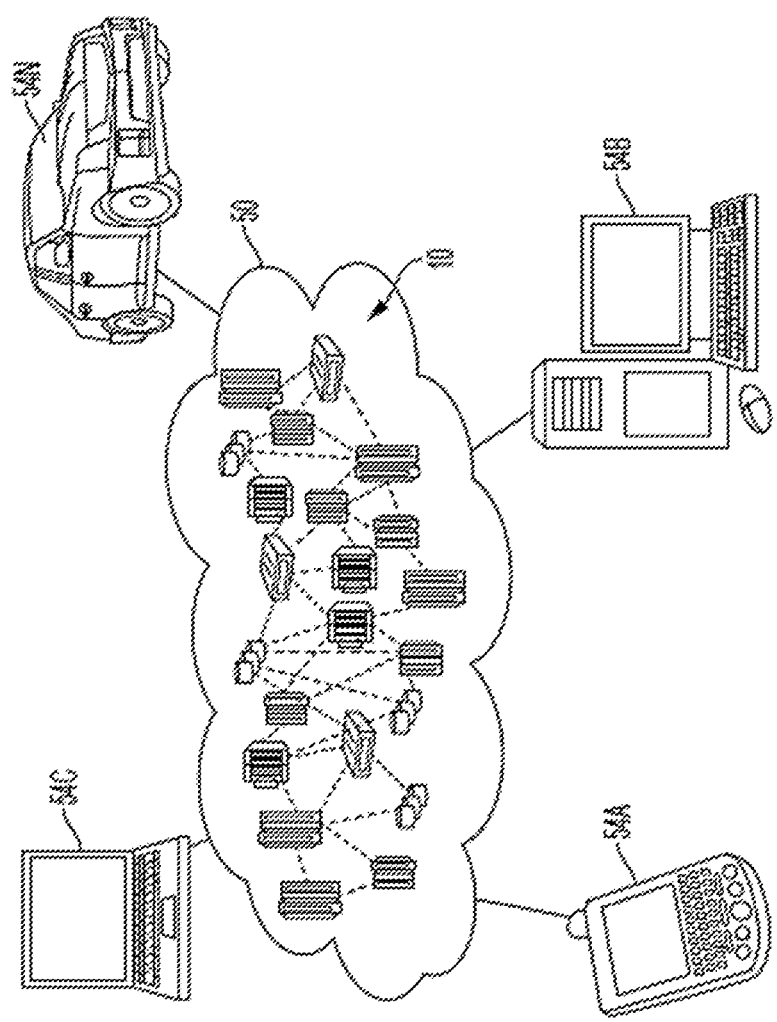
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
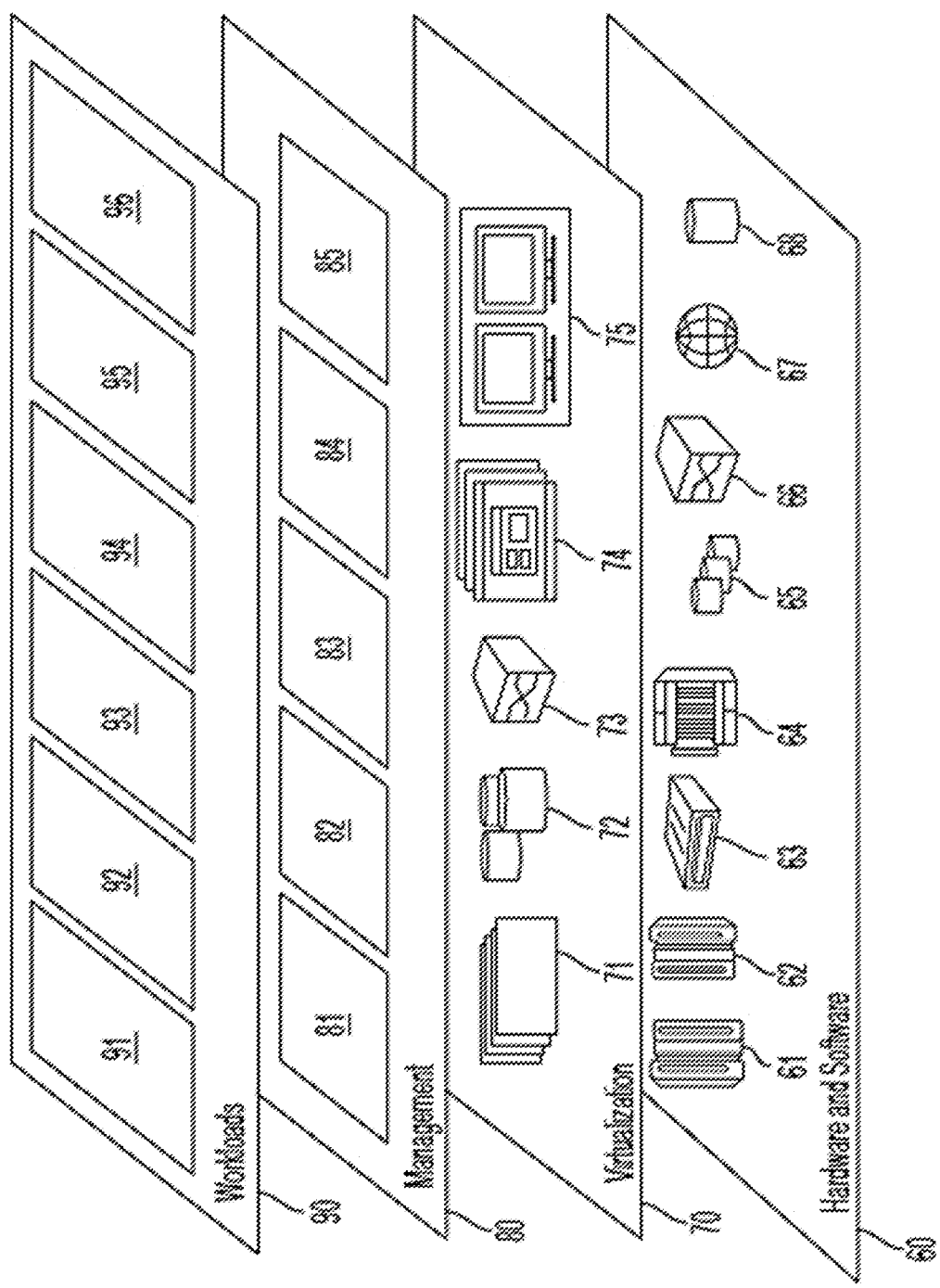
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic routing based on parsing of emergency dispatches 96.

It is understood that one or more embodiments of the present invention are capable of being implemented in conjunction with any type of computing environment now known or later developed.

Figure 6:
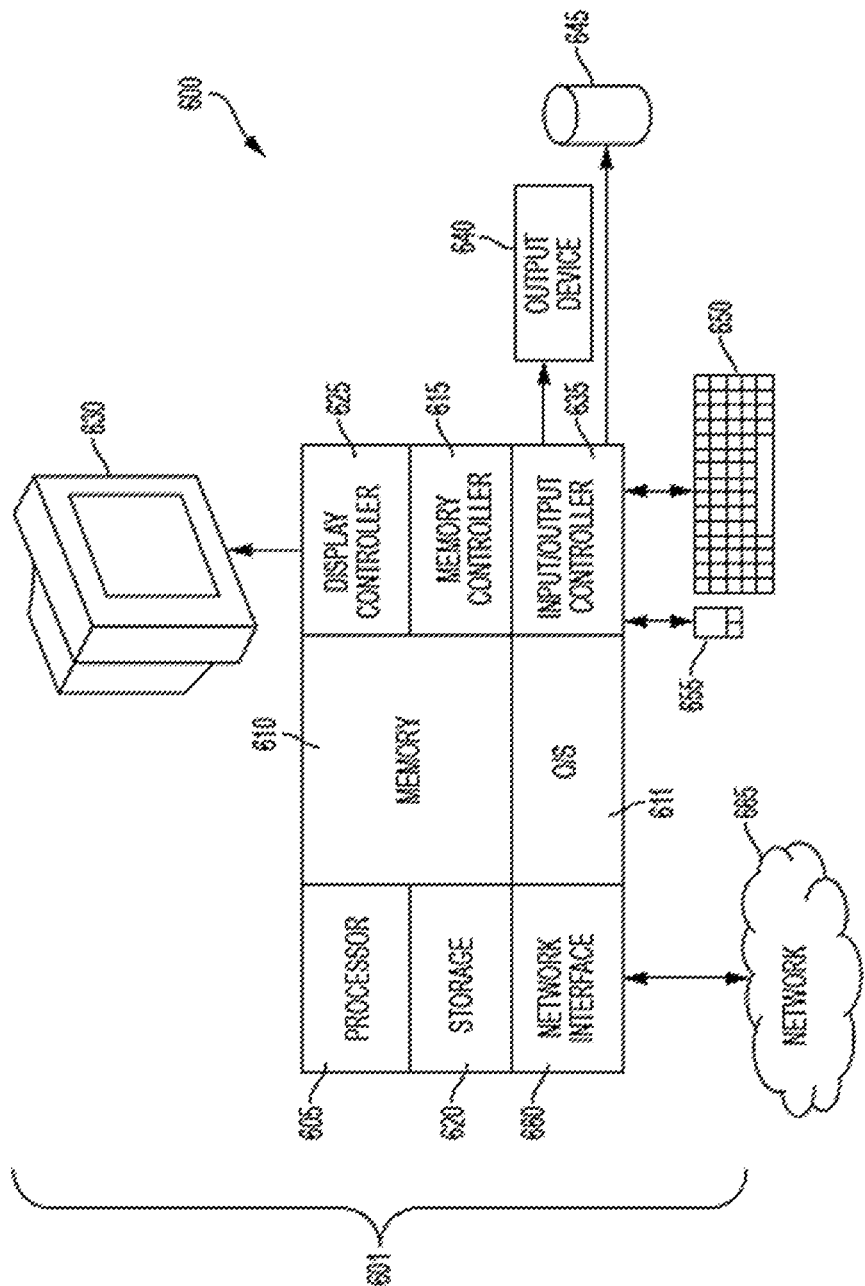
FIG. 6 illustrates a processing system for preemptive traffic routing based on parsing of emergency dispatches according to one or more embodiments of the present invention.

Turning now to FIG. 6, a computer system for buffer overflow trapping is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In one or more exemplary embodiments of the present invention, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

In accordance with one or more embodiments of the present invention, the memory 610 may include multiple logical partitions (LPARs) each running an instance of an operating system. The LPARs may be managed by a hypervisor, which may be a program stored in memory 610 and executed by the processor 605.

In one or more exemplary embodiments of the present invention, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630.

In one or more exemplary embodiments of the present invention, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions. In accordance with one or more embodiments of the present invention, computer 601 is an example of a cloud computing node 10 of FIG. 4.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for preemptive traffic routing based on parsing of emergency dispatches, the method comprising:
   obtaining, by a processor, an emergency dispatch transmission;
   parsing, by the processor, the emergency dispatch transmission to obtain a location and a type of an emergency event;
   determining, by the processor based at least in part on the location and the type of the emergency event, an expected impact on traffic in an area including the location; and
   transmitting, by the processor, the expected impact on traffic in the area to a vehicle navigation application.

2. The method of claim 1, wherein parsing the emergency dispatch transmission also obtains a number and a type of emergency response vehicles dispatched to the emergency event.

3. The method of claim 2, wherein determining the expected impact on traffic in the area including the location includes obtaining traffic data corresponding to previous emergency events that had the number and the type of emergency response vehicles dispatched.

4. The method of claim 1, wherein the emergency dispatch transmission is a radio frequency transmission and parsing the emergency dispatch transmission includes converting an audio signal of the emergency dispatch transmission to text.

5. The method of claim 1, further comprising:
   determining, by the processor, that the expected impact on traffic in the area has changed based at least in part on data received from one or more dispatched emergency vehicles; and
   transmitting, by the processor, an updated expected impact on traffic in the area to the vehicle navigation application.

6. The method of claim 5, wherein the data received from the one or more dispatched emergency vehicles includes responses to the emergency dispatch transmission transmitted by the one or more dispatched emergency vehicles.

7. The method of claim 5, wherein the determining that the expected impact on traffic in the area has changed is further based on a second emergency dispatch transmission regarding the emergency event.

8. The method of claim 5, wherein the updated expected impact indicates that the emergency event has been cleared.

9. The method of claim 1, wherein the expected impact on traffic in the area includes an indication of a number of lanes closed and an expected duration for that each of the number of lanes will be closed.

10. A computer program product comprising a computer-readable storage medium having program instructions embodied therewith, the program instructions executable by a processor to cause the processor to perform operations comprising:
    obtaining an emergency dispatch transmission;
    parsing the emergency dispatch transmission to obtain a location and a type of an emergency event;
    determining, based at least in part on the location and the type of the emergency event, an expected impact on traffic in an area including the location; and
    transmitting the expected impact on traffic in the area to a vehicle navigation application.

11. The computer program product of claim 10, wherein parsing the emergency dispatch transmission also obtains a number and a type of emergency response vehicles dispatched to the emergency event.

12. The computer program product of claim 11, wherein determining the expected impact on traffic in the area including the location includes obtaining traffic data corresponding to previous emergency events that had the number and the type of emergency response vehicles dispatched.

13. The computer program product of claim 10, wherein the emergency dispatch transmission is a radio frequency transmission and parsing the emergency dispatch transmission includes converting an audio signal of the emergency dispatch transmission to text.

14. The computer program product of claim 10, wherein the operations further comprise:
    determining, by the processor, that the expected impact on traffic in the area has changed based at least in part on data received from one or more dispatched emergency vehicles; and
    transmitting, by the processor, an updated expected impact on traffic in the area to the vehicle navigation application.

15. The computer program product of claim 14, wherein the data received from the one or more dispatched emergency vehicles includes responses to the emergency dispatch transmission transmitted by the one or more dispatched emergency vehicles.

16. The computer program product of claim 14, wherein the determining that the expected impact on traffic in the area has changed is further based on a second emergency dispatch transmission regarding the emergency event.

17. The computer program product of claim 14, wherein the updated expected impact indicates that the emergency event has been cleared.

18. The computer program product of claim 10, wherein the expected impact on traffic in the area includes an indication of a number of lanes closed and an expected duration for that each of the number of lanes will be closed.

19. A method for preemptive traffic routing based on parsing of emergency dispatches, the method comprising:
    obtaining, by a processor, an emergency dispatch transmission;
    parsing, by the processor, the emergency dispatch transmission to obtain a location and a type of an emergency event;

determining, by the processor based at least in part on the location and the type of the emergency event, an expected impact on traffic in an area including the location; and updating, by the processor, a route of one or more autonomous vehicles based on the expected impact on traffic.

20. The method of claim 19, wherein the emergency dispatch transmission is a radio frequency transmission and parsing the emergency dispatch transmission includes converting an audio signal of the emergency dispatch transmission to text.

\* \* \* \* \*